United States Patent [19]
Morita et al.

[11] Patent Number: 4,853,859
[45] Date of Patent: Aug. 1, 1989

[54] OPERATION DATA RECORDING SYSTEM

[75] Inventors: Izuru Morita; Shoji Tozawa; Tsuneo Hisatake; Tadasi Atono, all of Tokyo, Japan

[73] Assignee: Shin Caterpillar Mitsubishi Ltd., Tokyo, Japan

[21] Appl. No.: 270,479

[22] Filed: Nov. 8, 1988

Related U.S. Application Data

[63] Continuation of Ser. No. 820,982, Jan. 21, 1986, abandoned.

[30] Foreign Application Priority Data

Jan. 24, 1985 [JP] Japan .................................. 60-11529
Jan. 24, 1985 [JP] Japan .................................. 60-11528
Jan. 24, 1985 [JP] Japan .................................. 60-11527

[51] Int. Cl.4 ............................................... G06F 13/00
[52] U.S. Cl. ............................... 364/424.04; 340/459; 364/424.03
[58] Field of Search ...................... 364/424.01, 424.03, 364/424.04, 442, 550, 551, 436; 360/5; 340/52 F, 52 R

[56] References Cited

U.S. PATENT DOCUMENTS 4,013,875 3/1977 McGlynn ............................ 364/424
4,072,850 2/1978 McGlynn ............................ 364/424
4,159,531 6/1979 McGrath ............................. 364/900
4,181,943 1/1980 Mercer, Sr. et al. ............... 364/426
4,188,618 2/1980 Weisbart ......................... 364/442 X
4,258,421 3/1981 Juhasz et al. ....................... 364/424
4,551,801 11/1985 Sokol .................................. 364/424
4,562,545 12/1985 Hasegawa ...................... 364/431.12

*Primary Examiner*—Parshotam S. Lall
*Assistant Examiner*—Thomas G. Black
*Attorney, Agent, or Firm*—Robert E. Burns; Emmanuel J. Lobato

[57] ABSTRACT

This invention is composed of detecting means for detecting operating condition of a vehicle, operation data recording device loaded on a vehicle for arithmetic processing detected data to write into external memory unit, and external data processing device (external computer) for processing data stored in external memory unit. And of data detected by the detecting means, numeral value data such as speed, engine r.p.m. or the like are displayed to external display device, and operation or non-operation data are processed arithmetic to data for memorizing at arithmetic processing portion to be written into external memory unit.

While, data obtained from other than detecting means are input by external input portion of the operation data recording device to be written into external memory unit.

Thus input data and parameter stored in inner memory is enabled to accesse and to debug at any time through connector for maintenance.

After work in terminated, data for managing can be input to make external data processing device read data stored in the external memory unit.

10 Claims, 8 Drawing Sheets

| r.p.m of engine | frequency (%) |
|---|---|
| 2500 | 20 |
| 2000 | 40 |
| 1500 | 20 |
| 1000 | 10 |
| 500 | 10 |

| vehicle speed | frequency (%) |
|---|---|
| 0 ~ 5 | 10 |
| 5 ~ 10 | 15 |
| 10 ~ 15 | 30 |
| 15 ~ 20 | 26 |
| 20 ~ 25 | 14 |
| 25 ~ 30 | 3 |
| 30 ~ | 2 |

OPERATION DATA RECORDING SYSTEM

This is a continuation of application Ser. No. 820,982, filed Jan. 21, 1986 now abandoned.

BACKGROUND OF THE INVENTION (a) Field of the Invention

This invention relates to a system for recording operation or non-operation data for each of the component elements of a vehicle and/or data of numeral value such as vehicle speed and r.p.m. of an engine.

(b) Description of the Prior Art

It is well known in the art to provide a mechanical tachometer or in place of it a digital type operation data recording device for sensing and recording r.p.m. and travelling speed of a vehicle with working machine and to manage the vehicle.

The mechanical tachometer has some disadvantages in that arithmetic processing for the accumulated travelling distance etc. may not be performed and a correct numeral value may not be read due to a display on a small circular recording sheet.

In order to record digitally the actual performance of a work machine for the control of the working machine in the fields of automotive as well as construction machine industries, some systems are proposed such as disclosed in Japanese Patent Laid Open (Kokai) under Provisional Publication No. Sho 58-4493, a data-controlling system which records sequentially velocity of an automobile, travelling distance and engine r.p.m., Provisional Publication No. Sho 58-60212, a data-controlling system which judges that engine r.p.m. is classified in any of a plurality of the pre-determined patterns and records accumulated time for each pattern, and No. Sho 56-118166 and No. Sho 58-148912, data-controlling systems which record and process the work data of each of other components.

Although systems have already been proposed in order to solve the above-mentioned disadvantages, they require a large storage capacity so as to get the correct operation data.

That is, it is necessary to make a sampling of operation data at intervals of less than one second in order to sense the operation data similarly to the mechanical tachometer. However, it requires an external memory unit or a storage unit of large capacity so as to record the entire operation data.

Further, since the data have a large volume, it is sometimes found that other required operation data may not be recorded.

SUMMARY OF THE INVENTION

This invention has been invented as a result of sincere study in view of the above-mentioned circumstances and its main object is to provide a vehicle operation data recording system capable of storing each or the operation of non-operation data of the engine, travelling part and working machine, and data of numeral value such as travelling speed and r.p.m. of the engine etc. without requiring large storage capacity and without reducing sampling intervals.

DESCRIPTION OF THE PREFERRED EMBODIMENTS

Figure 1A:
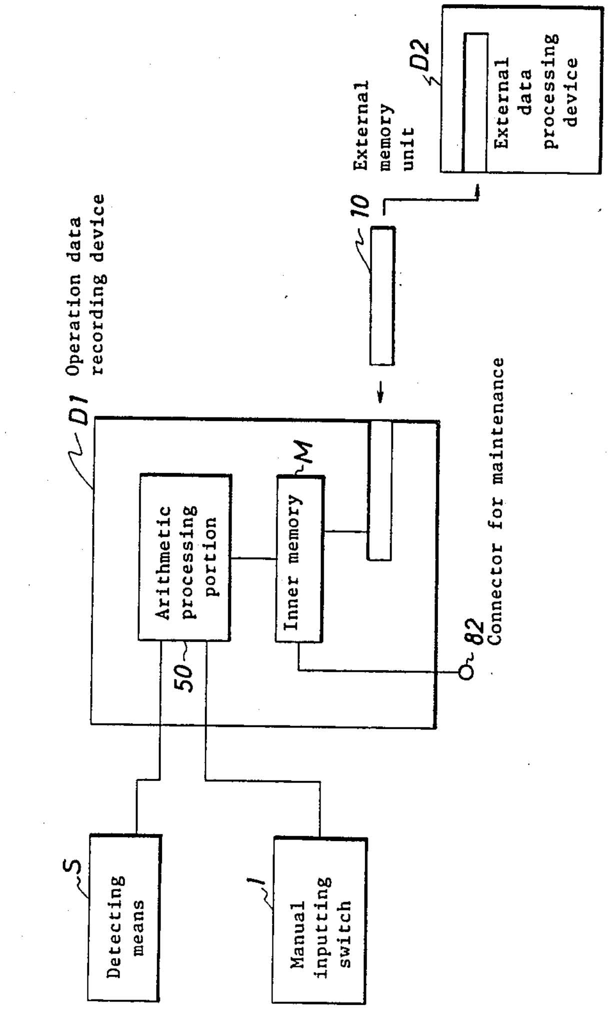
FIG. 1 (*a*) is a block diagram for showing functions of the present invention, (*b*) is an output image of operation or non-operation data and (*c*) is an output image of discriminating data.
Figure 1:
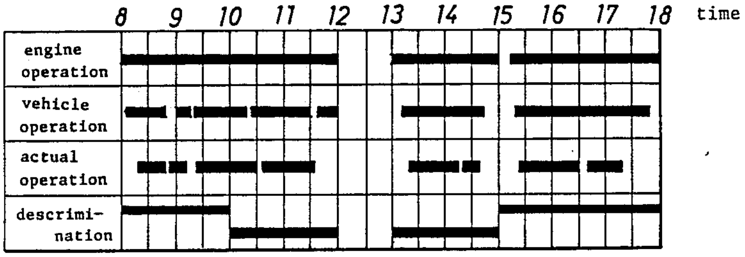
Figure 1C:
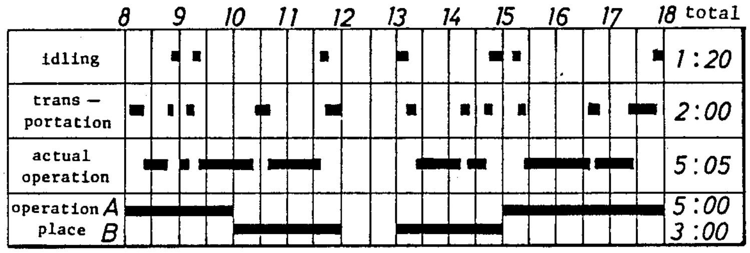

This invention relates to a system for operation data recording which will be explained with reference to a block diagram shown in FIG. 2. The system is composed of detecting means for detecting operating condition of a vehicle, operation data recording device D1 is loaded on a vehicle for arithmetic processing detected data to write into external memory unit 10, and external data processing device (external computer) D2 for processing data stored in external memory unit 10. Data detected by the detecting means S, numeral value data such as speed, engine r.p.m. or the like are displayed to external display device 6, and operation or non-operation data are processed arithmetically to data for memorizing at arithmetic processing portion 50 to be written into external memory unit 10.

While, data obtained from other than detecting means S are input by an external input portion 1 of the operation data recording device D1 to be written into the external memory unit 10.

Thus input data and parameter stored in inner memory M is enabled to be accessed and to debug at any time through a connector for maintenance.

After work is terminated, data for managing can be input to make external data processing device D2 read data stored in the external memory unit 10.

One preferred embodiment of the present invention in which the operation data recording system for a vehicle will be described in reference to the figures subsequent to FIG. 2.

The operation data recording system for a vehicle is composed of an operation data recording device D1 which is composed of a microcomputer installed in a cabin of a vehicle, a group of sensors S connected to said operation data recording device D1, an external computer D2 placed in a management office or the like out of the vehicle and IC card 10 for showing one example of an external memory (medium) for recording and storing the operation data obtained from said operation data recording device D1 and inputting it into the external computer D2.

The group of sensors S includes an engine operation sensor S1 for detecting operation or non-operation of the engine, a vehicle operation sensor S2 is provided for detecting operation or non-operation i.e., travelling or nontravelling of the vehicle, an actual operation sensor S3 for detecting actual operation or non-operation of the working machine or the vehicle, and so forth is likewise provided.

The engine operation sensor S1 is a sensor for producing an operation (for example, OFF) signal when the engine is operating and for producing non-operation (for example, ON) signal when the engine is stopped, and in the preferred embodiment an engine hydraulic pressure sensor is provided which is ON when the engine hydraulic pressure is 0 and in turn which is ON when the hydraulic pressure is increased. However, it may also be possible to provide a sensor for r.p.m. of the engine which produces an ON signal when the r.p.m. is 0 and OFF signal when the r.p.m. are other than 0.

The vehicle operation sensor S2 is provided with a speed sensor for the vehicle for detecting the travelling speed of the vehicle. However, it may also be possible to provide a sensor which produces an operation (for example, ON) signal when the vehicle travels and produces a non-operation (for example, OFF) signal when the vehicle is stopped. However, it may also be possible to provide such a sensor for sensing position of a speed control lever which produces OFF signal when the lever is at its neutral position and ON signal when the lever is placed other than the neutral position.

Next, the actual operation sensor S3 is a sensor for producing an operation (for example, ON) signal when the vehicle or the working machine performs an actual operation and non-operation (for example, OFF) signal when the vehicle or the working machine does not perform any actual operation, and in the preferred embodiment it is a working machine hydraulic pressure sensor which produces an OFF signal when the working machine hydraulic pressure is 0 and an ON signal when the hydraulic pressure is increased. However, it may also be possible to provide such a sensor as one for discriminating the operation or non-operation of the working machine in response to the position of the control lever of the working machine.

When a vehicle does not provide a working machine such in the cases as of a taxi cab, a highway-off truck or the like, it may also be possible to provide a switch which is switched manually by an operator or a switch or a sensor which discriminates an actual operation linked together by a device which is driven only during the actual operation.

Figure 3A:
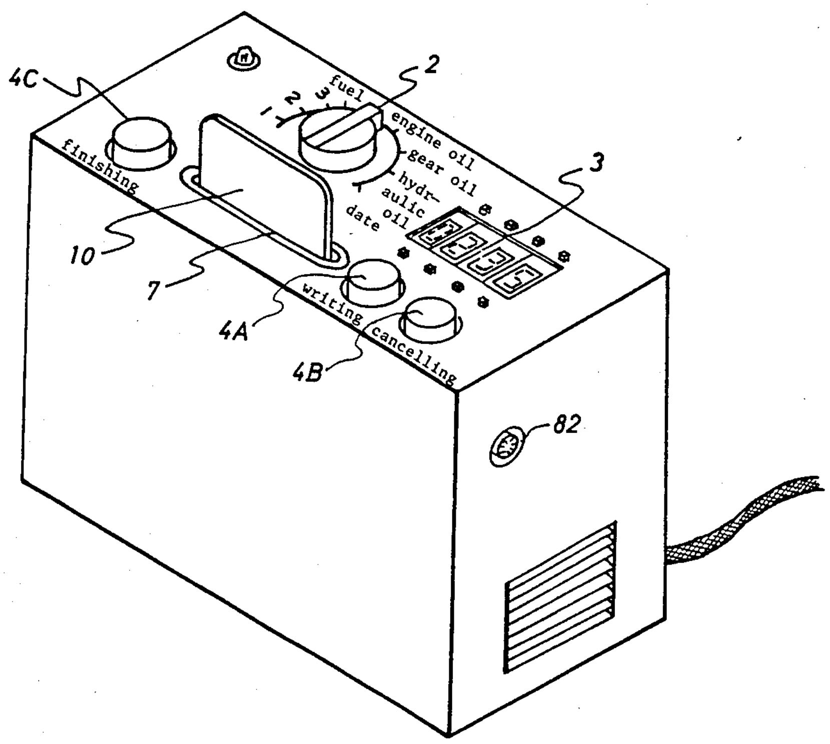
FIG. 3 (*a*) is a perspective view of operation recording device and (*b*) is a block diagram showing the main portion of a circuit.
Figure 3B:
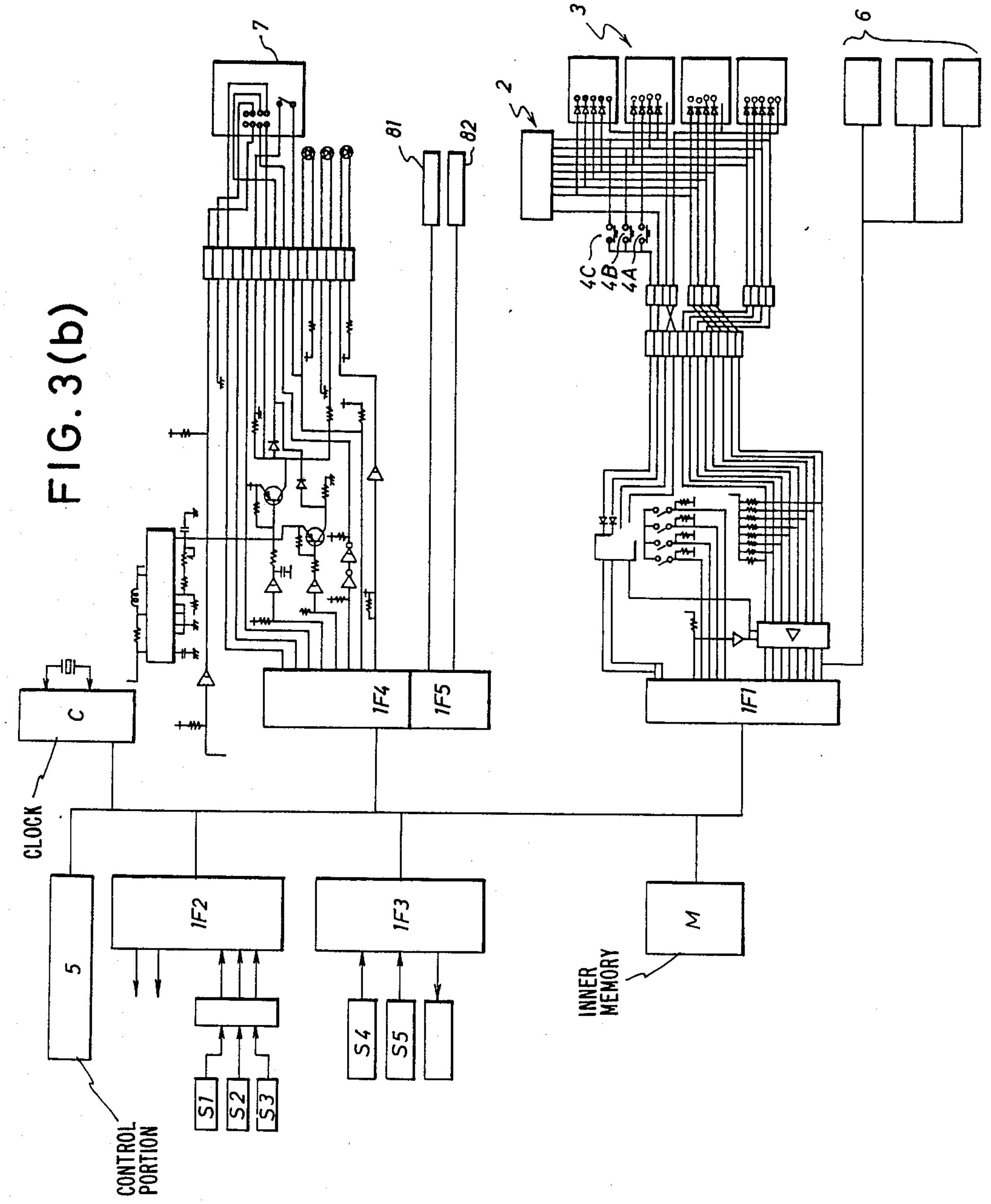

The operation data recording device D1 to which the sensors S1 to S3 are connected is composed of the sensors S1 to S3, an external input portion 1 for the fixed data, and external display device 6 for displaying operation data, and data reading and writing portion 7 to which IC card 10 can be removably inserted and each of them are connected to a control portion 5 through interface portions IF 1 to 5 as shown in FIG. 3.

That is, the external input portion 1 for the fixed data is composed of a manual switch 2, a value setting switch 3, a writing switch 4A and a cancelling switch 4B. Here, 4C denotes a finishing switch turned on when the work is finished.

The manual switch 2 is composed of a rotary switch, each of the modes is classified into each of the fixed data for manual inputting, for example, a date, identification number such as kind of operation or operation place etc., volume of supply of fuel, engine oil, gear oil or hydraulic oil.

Secondly, the writing switch 4A is turned on after a choice of the manual switch 2 and a setting of the value setting switch 3, and has a composition which at the time when the said writing switch 4A is turned on is written in an inner memory M and in IC card 10 together with data (fixed data) input by the on-switching of the writing switch 4A.

Therefore the date and the time of setting the manual switch 2 at the corresponding items are automatically recorded in the inner memory M and the IC card 10.

And in the case of identification number, the data of the identification number of setting the rotary switch and on-switching of the writing switch 4A are automatically recorded in the inner memory M and the IC card 10 together with the time of turning on the writing switch 4A.

In case of other fixed data such as the volume of fuel supply, they are input together with the time of turning on the writing switch 4A and written in the inner memory M and the IC card 10 by rotating the manual switch 2 to the corresponding item, setting of the supplying volume with the value setting switch 3 and turning on of the writing switch.

In case of the preferred embodiment, this value setting switch 3 is composed of a digital setting switch.

Further, when the writing of these fixed data is erroneous, it is possible to delete the erroneous data and to write the correct data over by a setting of the cancelling switch 4B.

In this way, each of the detecting signals output from each of said sensors S1 to S3 and the operation data input from the external input portion are fed to the arithmetic processing portion 50 of the control portion 5.

In the clock portion C which is backed up, when the IC card 10 is inserted into the data reading and writing portion 7, the time data are output at the control portion 5 in real time basis and at the same time the accumulated total value is read from the inner memory M and the operation time is started to be accumulated.

These clock data are output at an external display device 6 of LED or LCD which is connected to the interface portion IF2 which is also acting for inputting the fixed data in the preferred embodiment.

Here in the clock portion C, the output of the time data is finished by turning on the finishing switch 4C and at the same time the accumulation of the accumulated time is finished and the said accumulated total value is memorized in the inner memory M until the following accumulation is started.

Then, the control portion 5 stores the clock data from the clock portion C, fixed data input from the external input portion 1 for fixed data and the operation or non-operation data input from various sensors S in the inner memory M.

In turn, the control portion 5 is connected to the data reading and writing portion 7 through the interface portion IF3.

L1 to L3 denote lamps, i.e., a card-in lamp L1 is lit when the IC card 10 is inserted into the data reading and writing portion 7, an error lamp L2 is lit when ID card does not coincide and a busy lamp L3 is lit during a writing-in operation, respectively.

At the control portion 5, an interface portion IF5 is connected similarly, and in this embodiment, a terminal 81 of serial correspondence for RS232C makes it possible to connect a terminal, a printer and so forth. Further a connector 82 for maintenance is also provided to make it possible to debug such as to correct a parameter (parameter to be used for the arithmetic value of a vehicle speed) which is characteristic of a vehicle and is predetermined in the control portion 5, to read out back-up data, to alter setting date and time and so forth.

Therefore, the control portion 5 makes the operation data stored and calculated in an arithmetic processing portion 50 be written into the portable external storage unit, i.e., the IC card 10 in the preferred embodiment by the data reading and writing portion 7.

Similarly, the desired operation data stored and calculated by the arithmetic processing portion 50 are externally displayed by the external display device 6.

Vcc denotes a power supply in which a voltage in a vehicle battery is changed to a voltage required for the operation data recording device and it is supplied to each of the component elements.

Figure 2A:
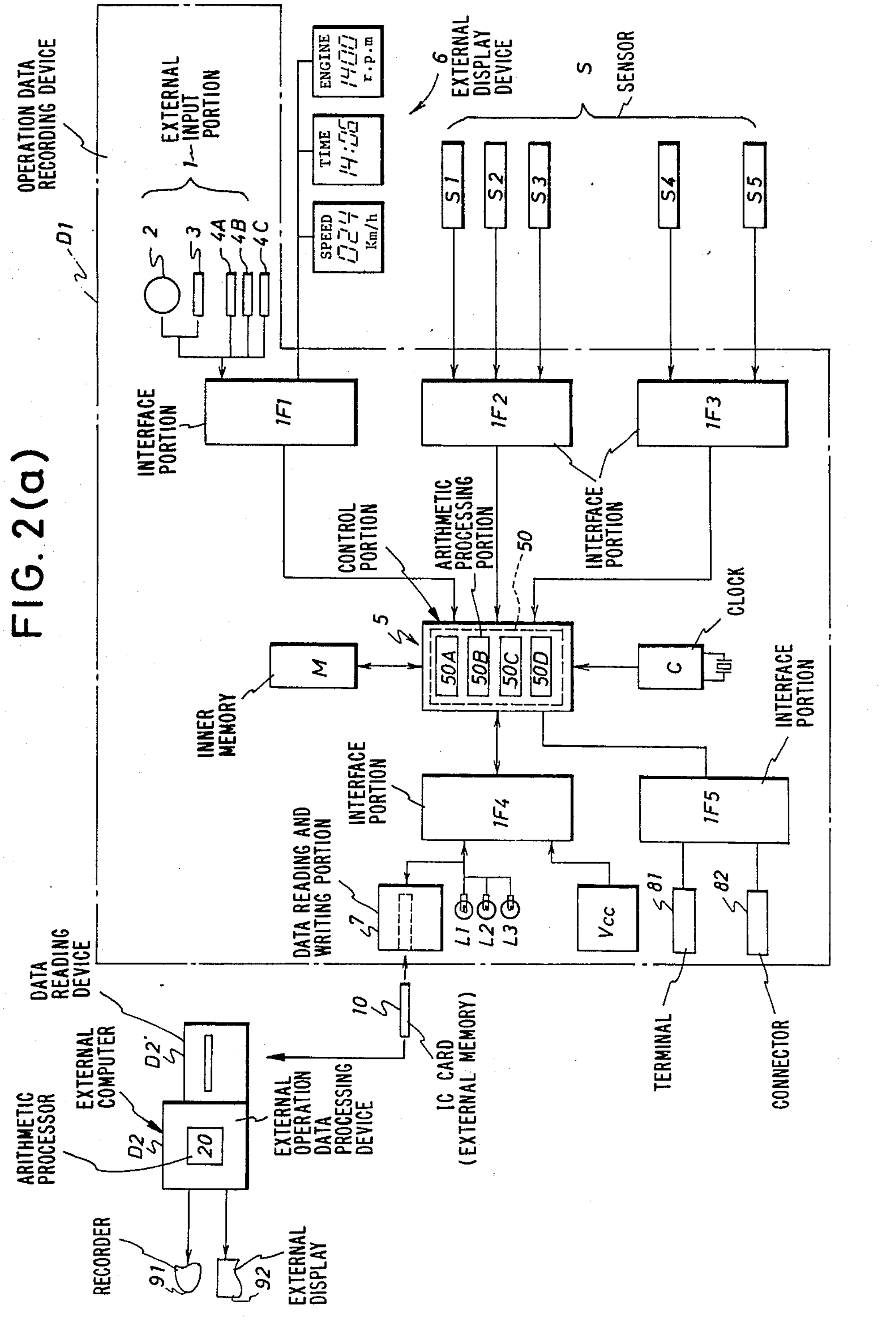
FIG. 2 (*a*) is a block diagram for showing an operation data recording system, and (*b*) and (*c*) are block diagrams of an arithmetic portion.
Figure 2B:
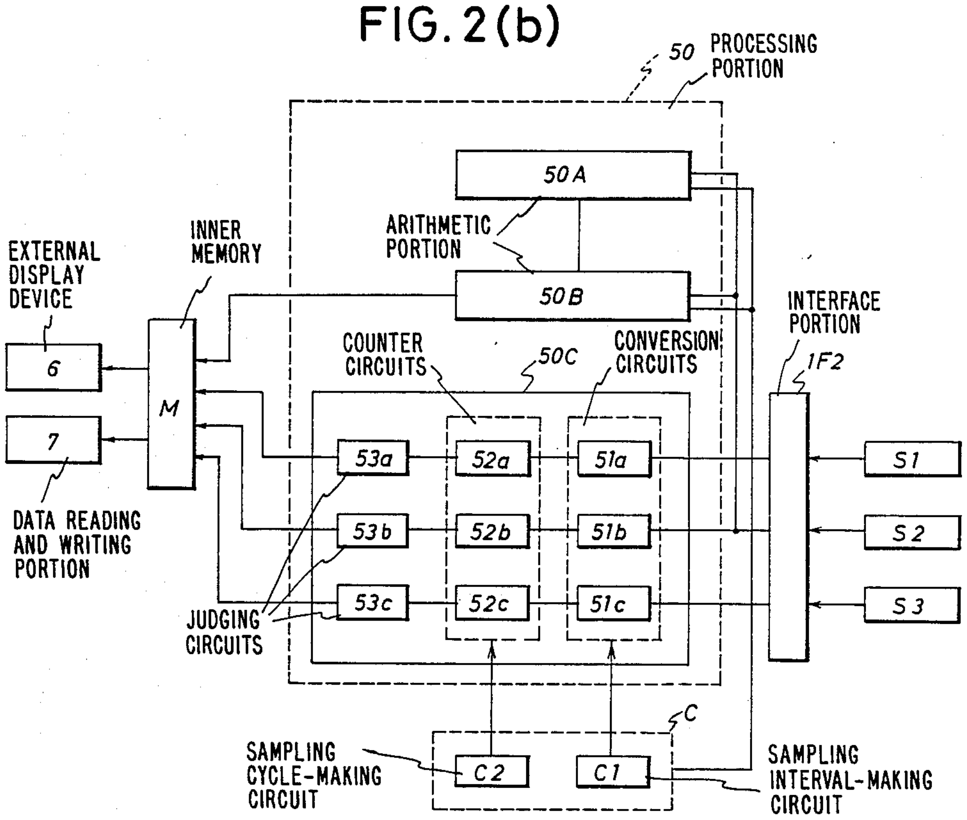
Figure 2C:
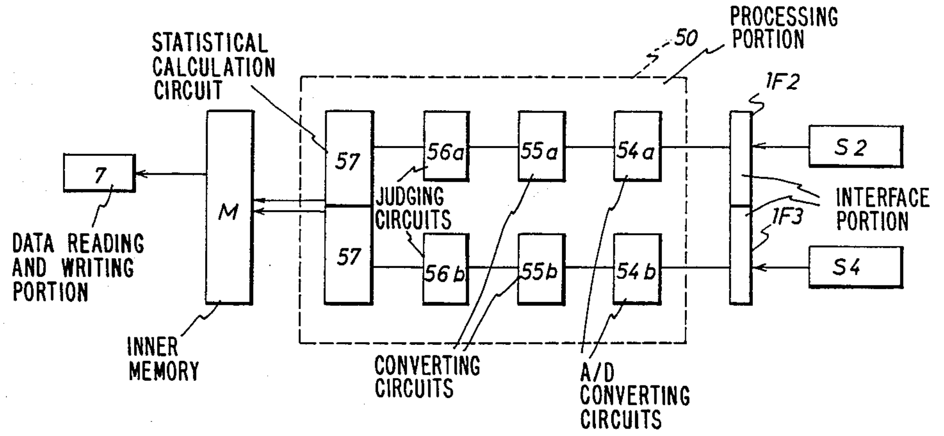

Then, FIG. 2 (*b*) and (*c*) show block diagrams of a processing portion 50 in FIG. 2 (*a*)

In this arithmetic processing portion 50, there are provided accumulated data arithmetic portion 50A for accumulating vehicle speed, travelling distance and time data, arithmetic portion 50B for external display for displaying these accumulated data, sampled data and accumulated data in real time externally, and data compressing and processing portion 50C for compressing a sampled operating data to store in an IC card.

That is, at the accumulated data arithmetic portion 50A, for example to calculate accumulated time accumulated from work-opening time which is recorded when engine hydraulic pressure is increased, using time data of the clock portion C which is composed of a clock generator, and to calculate accumulated working time in the aggregate. In addition, accumulated distance is calculated on the basis of vehicle data from vehicle speed sensor S2 and the above-mentioned time data.

At the arithmetic portion 50B for. external display vehicle speed data with a short cycle obtained from a vehicle speed sensor S2, time data in real time obtained from the clock portion C and each of the accumulated data calculated at above-mentioned accumulated data arithmetic portion 50A are output to the external display device 6 in real time.

And at the data compressing arithmetic portion 50C, there are conversion circuits 51*a* to c, counter circuits 52*a* to c and judging circuits 53*a* to c.

That is, for each of the sensors S1 to S3, a sensor for sampling in a short cycle, a cycle at intervals of one second in this embodiment, in digital is employed. While in the case the sensor is an analogue sensor, the above-mentioned conversion circuits 51*a* to c is connected to a sampling interval-making circuit Cl which makes sampling intervals of one second provided in the clock portion C for inputting analogue data to the counter circuits 52*a* to c making A/D converting to digital data at intervals of one second.

A sampling cycle-making circuit C which makes a long interval for recording (interval of 30 seconds in this embodiment) is connected to the counter circuits 52*a* to *c* to add number of operation signal (ON) or non-operation signal (OFF) which are input within 30 seconds.

The added number of the signals is fed into the judging circuit 53.

This judging circuits 53*a* to *c* are operated such that it uniformly judges the operation (ON) or non-operation (OFF) when, for example, the added number of signals exceeds the predetermined reference value.

The above-mentioned predetermined reference value is for judging for example the whole 30 seconds to be an operating condition if signals of operation are input more than the certain times per unit of 30 seconds, and is determined statistically and experientially beforehand.

The data of operating and non-operating thus judged and determined are compressed to operating or non-operating data which intervals are prolonged in comparison with the short sampling intervals from the sensor to be memorized in the inner memory M, at the same time, is written in the IC card 10 through the data reading and writing portion 7.

Thus, even if data sampling intervals are relatively long, it may not be an intermittent one but it is possible to obtain the data of operation or non-operation corresponding to the actual operation.

In this invention, the component of the data compressing can provide a judging circuit which judges alternations of other data (for example vehicle speed data) to be applied to which one of the predetermined alternating patterns, and be memorizing a kind of patterns and the time into the inner memory M and IC card 10.

Further in the control portion 5, arithmetic portion 50D for statistical recording can be provided as shown in FIG. 2 (*c*) to process data statistically which are detected as numerical values (r.p.m. and so forth) from the sensor S.

In this case, a detected signal at short intervals which is detected from the vehicle speed sensor S2 is input via IF2 to statistical judging circuit 56*a* to be converted into vehicle speed data in converting circuit 55*a* via A/D converting circuit 54*a*.

The statistical judging circuit 56 operates such that the vehicle speed value is classified in a predetermined speed distribution (for example, intervals of 5km/h) in reference to the input vehicle speed data and performs a well-known statistical processing to calculate the number of signals as a frequency (%) for every area with a statistical calculation circuit 57.

In addition, when a sensor for sensing the operation data for detecting the numerical value (r.p.m.) is applied, for example, even when the operation or non-operation of the engine is detected by a sensor S4 for detecting the r.p.m. of the engine, it is possible to obtain the operation or non-operation data as well as the statistical operation data with a similar arrangement IF2, 54*b* -54*b* and 57.

The statistical data obtained in this way are stored temporarily in the inner memory M, the statistical arithmetic processing is performed in arithmetic portion 50D for statistical recording under setting of the termination switch when the normal (daily) entire operation is completed, and then the result is written into the IC card 10.

With this arrangement, the IC card 10 can contain the following items:

(i) operation or non-operation data of the engine
(ii) operation or non-operation data of the vehicle
(iii) actual operation or non-operation of the working machine
(iv) discrimination data (data relating to the kind of work etc.)
(v) supply volume of fuel, etc.
(a) engine oil
(b) gear oil
(c) hydraulic oil, etc.
(vi) statistical data of rotational speed of the engine
(vii) statistical data of vehicle speed
(viii) time of work starting time of work finishing
(ix) data of travelling distance FIG. 3 (*b*) shows a block diagram of the main circuit of this recording system for operation data.

Hereupon IF 1 to 5 denote interface portions for connecting a peripheral equipment to the control portion 5. The external input portion 1 and the external display device 6 are connected to IF 1 and the engine operation or non-operation sensor S1, the vehicle speed sensor S2 and actual work sensor S3 are connected to IF2.

And an engine r.p.m. sensor S4 is connected to IF 3.

A data reading and writing device 7, a battery (power supply) Vcc and so forth.

IF5 denotes an interface provided with a terminal 81 of serial correspondence for RS232C making it possible to connect a terminal, a printer and so forth in this embodiment. Further a connector 82 for maintenance is also provided to make it possible to correct a parameter (a parameter to be used for arithmetic of vehicle speed) which is characteristic of a vehicle and is predetermined in CPU in the control portion 5, to read out back-up data, to alter setting date and time and so forth.

Figure 4:
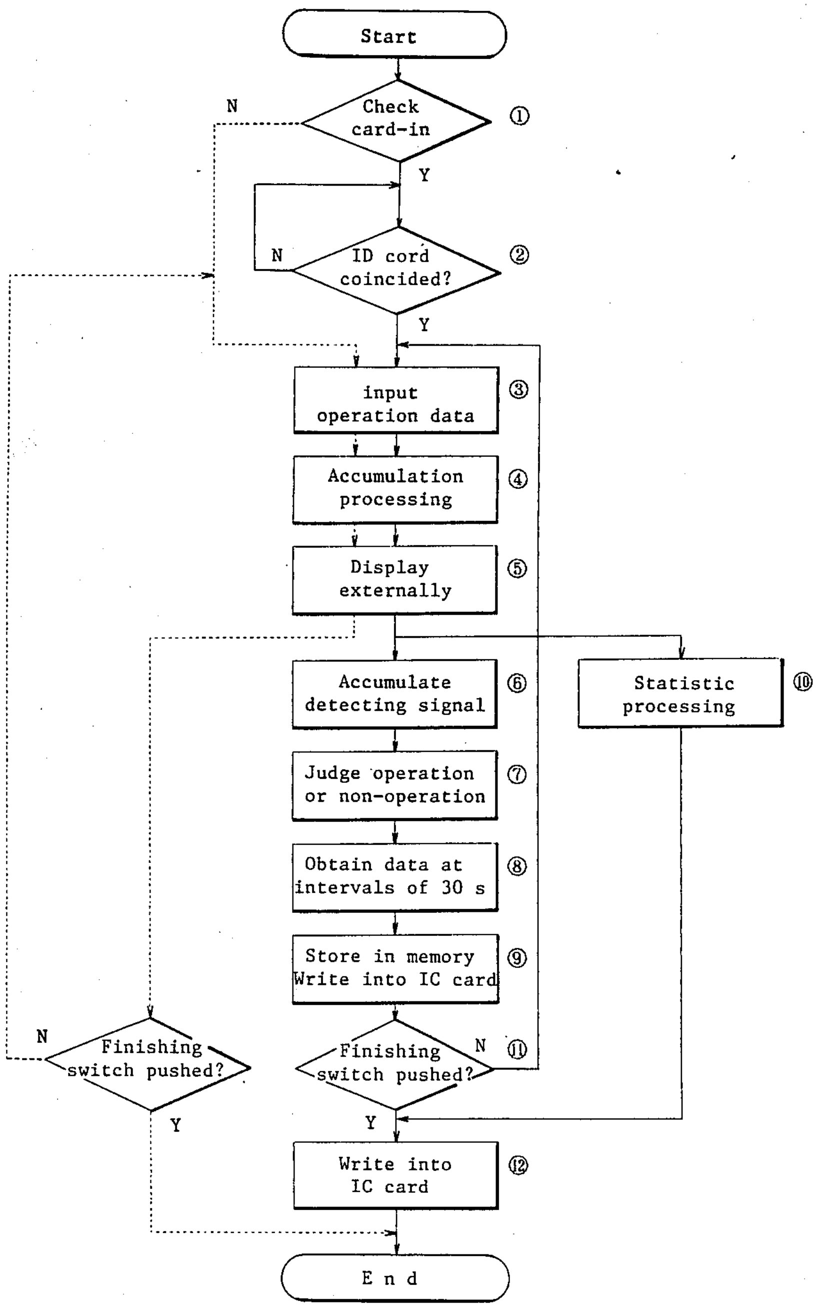
FIG. 4 is a flow chart of data recording of operating conditions.

Then the action of this operation data recording system will be explained as follows. When a main switch (not shown) of a vehicle is turned on, this operation data recording device starts and an operation data recording program is executed according to a flow chart shown in FIG. 4.

At first, in step (1), judging whether the IC card is inserted to the data reading and writing portion 7 or not is performed.

Card-in mode is chosen when the IC card 10 is inserted in a card inserting hole in the data reading and writing portion, and card-out mode is chosen when the IC card 10 is not inserted.

In card-out mode, only external displaying processing of operation data is performed as its procedure is shown with dotted line in the figure.

In code-in mode, judging whether an ID card recorded in IC card 10 in the following step (2) is coincident with the operation data recording device or not is performed.

When the ID code is coincident with the data, IC card 10 becomes a condition in which it can be written, and the time of engine hydraulic pressure increasing or operation starting time is recorded through the clock function C.

While the data from each of the sensors from S1 to S4 are input in the step (2), travelling distance and accumulated time are calculated on the basis of data of vehicle speed fed from the vehicle speed sensor S2 and the time data of clock function C, by the accumulated data-arithmetic portion 50A of the arithmetic processing portion 50 in the step (4).

Then in the step (5), these accumulated data, the data of vehicle speed at short intervals which has been the base of the accumulation, engine r.p.m. data by the sensor S4, and the time data in real time are input to the external display device 6 of LED, LCD or the like in a vehicle cabin through the external display arithmetic processing portion 50B respectively.

With reference to the operation or non-operation data, each operation or non-operation datum is accumulated in longer intervals (intervals of 30 seconds) than shorter intervals (intervals of 1 second) on the basis of the detected signals in the short intervals from the sensors from S1 to S3.

In the step (7), the judging is performed on the basis of the added number of signals showing the operation or non-operation, thereby judging of the operation or non-operation for entire period of 30 seconds is performed.

As a result of the judgement, the operation or non-operation data at intervals of 30 seconds are obtained in the step (8) to be recorded in IC card 7 and be memorized in the inner memory M at the same time in the step (9). (In the card-out mode, only the external display processing in the steps (3) to (5) are performed.)

Further the r.p.m. data detected with them by the sensor S2 and the sensor S4 are input to he arithmetic portion for statistical recording 50D and are statistically processed in the step (10).

Meanwhile an operator sets a kind of work, a place of work and so forth as discriminated signals, operating a manual switch 2 and value setting switch 3 as occasion demands, and the data is memorized in the inner memory M and the IC card 10 by turning on the recording switch 4A together with the time thereof.

During the operation, when the engine oil, gear oil and hydraulic oil etc. are supplied at any time, the operator sets said manual switch 2 to each of the items and the value of supplying volume under an operation of the value setting switch 3.

Upon completion of the setting operation, a turning-on of the writing switch 4A causes the above set data to be stored in the inner memory M and in the IC card 10 together with the time. In case that the above-mentioned setting is wrong, the data stored in the inner memory M are deleted under a turning-on of the cancelling switch 4B and then the correct data are set again in accordance with the above-mentioned order.

They are written in the IC card 7 as well as the above-mentioned operation data.

Pushing of the completion switch button in the step (11) causes it to be judged as a finish of operation, and in the step (12), a total value of the finishing time and the accumulation time is stored in the inner memory M and at the same time each of the statistical data processed statistically, the operation data of time series not recorded, fixed data and so forth is written into the IC card 10 from the inner memory M through the data reading and writing portion 7.

And when the writing to the IC card 10 is finished and the operator turns off the main switch as the entire work is finished, the engine stops and this program is completed.

Then the IC card of which the writing operation is completed is pulled out from the data reading and writing portion 7 to be inserted into the data reading device D2' and the operation or non-operation data and so forth stored in the IC card 10 are input to the operation data processing device D2 of the external managing office or the like through it.

The operation data processing device D2 is composed of a microcomputer system.

Figure 5:
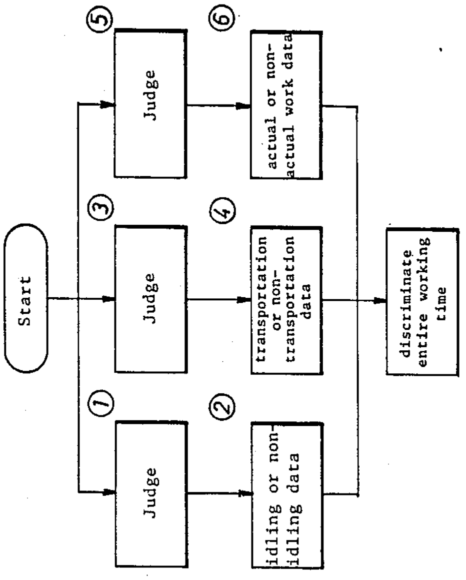
FIG. 5 is a flow chart of discriminating data recording.

When the operation discriminating program is started in the arithmetic processing portion 20 as shown in FIG. 5, at first it is judged in the step (1) whether there is a combination of operation of the engine, non-operation of the vehicle and non-operation of the actual working machine or the like in the operation data at every specified interval, and in turn in the step (2), an engine idling is judged to be operating when the above-mentioned combination is found, and it is judged to be non-operating when the above-mentioned combination is not found within the corresponding specified interval, thus discriminating the operation or non-operation of the engine idling in the total working time.

Similarly, side by side in the step (3), it is judged whether there is a combination of the operation of the vehicle and non-operation of the actual working machine or the like in the operation data at every specified interval, and in turn in the step (4), the vehicle is judged to be transporting when the above-mentioned combination is found, and it is discriminated transportation or non-transportation of the vehicle in the entire working time within the corresponding specified interval.

Further similarly, side by side in the step (5), it is judged whether there is a combination of the operation of the vehicle and non-operation of the actual working machine or the like in the operation at a at every specified interval of time, and in turn in the step (6), when the above-mentioned combination is found, the operation or non-operation of the actual work in the entire working time is discriminated, judging it operating condition if it is within the corresponding specified interval.

Thereby, it is possible to discriminate the entire working time under a separation of engine idling, operation of the vehicle, an actual operation of the vehicle and rest time (all the operations in the working are not performed).

In case of thus discriminating data, the data of engine idling or non-idling for example, the idling data are accumulated at longer intervals and can be compressed to the discriminating data at longer intervals utilizing the judging means for judging a condition to be engine idling when their total value exceeds the predetermined fundamental value.

The discriminating data are applied as management data by the external display means 92 and the recording means 91.

In the above-mentioned preferred embodiment, although data processing has been performed for each operation data recording device D1 placed on the vehicle and the external operation data processing device D2, data processing may be performed simultaneously with the above-mentioned operation data recording device placed on the vehicle.

That is, in this case, there are provided in advance an idling operation judging means 57, vehicle transportation judging means 58 and the actual operation judging means 59.

Figure 6:
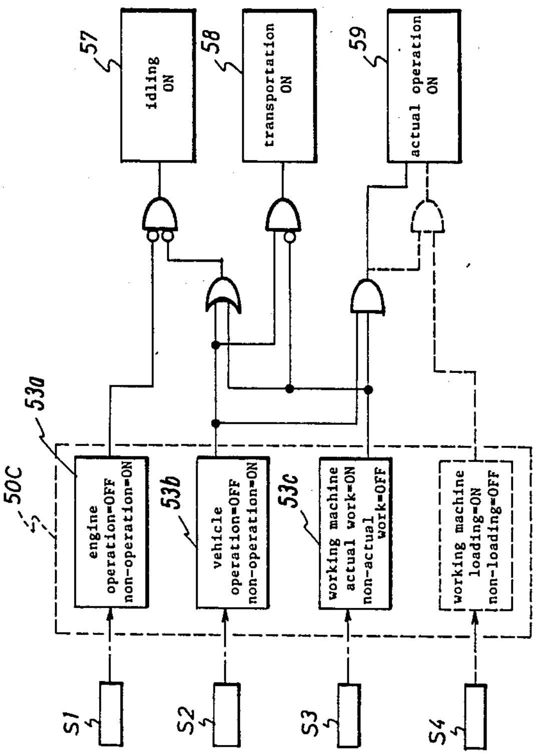
FIG. 6 is a discriminating and judging circuit diagram.

As one example is shown in FIG. 6, in the idling operation judging means 57, the vehicle operation judging circuit **53*b* and the working machine actual working condition judging circuit 53*c* are connected by NAND circuits, and their output terminals and the engine operation judging circuit 53*a*** are connected by AND circuits to be reversed together.

Therefore, when the engine operation signal, vehicle non-operation signal and the working machine non-actual operation signal are input at the same intervals, an idling condition signal is output.

Then, the transportation judging means 58 is connected to the vehicle operating condition judging circuit **53*b* by AND circuit with the output signal of the working machine actual working condition judging circuit 53*c*** being reversed.

Therefore, when the vehicle operation signal and the working machine non-actual working signal are input at the same intervals, the transportation signal is output.

Further, the actual operation judging means 59 is constructed such that the working machine actual operating condition judging circuit **53*c* and the vehicle operating condition judging circuit 53*b*** are connected by AND circuits.

Therefore, when the vehicle operation signal and the working machine actual operating signal are input at the same intervals, the actual operation signal is output.

If the actual operation is limited to the case in accordance with the kind of working machine in which for example a load is applied on the working machine, in addition to the above-mentioned condition, another arrangement can be applied in which an actual operation signal is output by AND circuits when the load signal is obtained by a converting circuit (not shown) from the sensor S5 for detecting a load applied to the working machine, then the number of loading data in 30 seconds is accumulated by the counter circuit, thus the accumulated value is judged by the judging circuit to be loading or non-loading signal as whole 30 seconds, and the resulting loading signal is input at 30 seconds intervals.

Since each of the judged and detected idling or non-idling signal, transportation or non-transportation signal and actual operation or non-operation signal has intervals of 30 seconds, it is preferable to convert it into said operation or non-operation data having intervals of longer specified time.

Also in this case, there is provided a judging circuit for judging it as operation when they exceed the desired reference number and otherwise as non-operation to accumulate operation judging data under a longer specified time exceeding 30 seconds in the same manner as that of the above-mentioned conversion processing for operation or non-operation data.

Thus, it is possible to make a correct and easy understanding of daily working conditions.

Further, in the present invention, since an external memory unit with a small capacity can be applied, it is not necessary to restrict the kind of external memory unit in particular, and it is apparent that for example, IC card, EPROM, floppy disk, optical disk, memory pack, MT and the like can be applied and it may not be restricted to these items.

What is claimed is:

1. An operation data recording system for apparatus having an engine and a working machine on a vehicle, comprising detecting means on board the apparatus comprising a plurality of sensors comprising a first sensor for detecting engine operation conditions, second sensor for detecting vehicle operation conditions and a third sensor for detecting working machine operation conditions, engine operation judging circuit means connected with said first sensor, vehicle operation circuit means connected with said second sensor, and working condition judging circuit means connected with said third sensor, idling operation judging means connected with said engine operation judging circuit means, said vehicle operation circuit means and said working condition judging means for indicating idling operation when said first sensor indicates that the engine is operating, said second sensor indicates that the vehicle is not operating and said third sensor indicates non-transportation, judging means connected with said vehicle operation circuit means and with said working condition judging circuit means for indicating transportation operation when said second sensor indicates vehicle operation and said third sensor indicates non-operation of said working machine.

2. An operation data recording system for an apparatus having an engine and a working machine on a vehicle comprising, detecting means on board the apparatus comprising a plurality of sensors comprising a first sensor for detecting corresponding engine operation conditions, a second sensor for detecting vehicle operation conditions and a third sensor for detecting working machine operation conditions, idling operation judging means connected by gate circuits with said first sensor and said second sensor to indicate idling operation when said first sensor indicates the engine is operating and said second sensor indicates that the vehicle is not operating and transportation judging means connected by gate circuits with said second sensor and said third sensor to to indicate transportation operation when said second sensor indivehicle operation and said third sensor indicates non-operation of said working machine, an external display device for displaying selected data representative of said operation conditions in real time obtained from said detecting means, an operation data recording device on the apparatus having data writing means for writing data corresponding to said operation conditions, an IC card insertable in the operation data recording device and removable therefrom, means including arithmetic processing means in said data recording device for processing operation data from said detection means for external displaying thereof on said external display device and for processing said operation data for recording operation data on said external memory unit while inserted in said data recording device, an external data processing device remote from the apparatus for processing data stored in the IC card when removed from said data recording device and applying thereto management data for use in managing the apparatus when the IC card is inserted in said operation data recording device, said operation data recording device having an internal memory for receiving data from said data writing means, a maintenance connector connected to said internal memory for manually inputting a predetermined parameter into said internal memory, and reading and writing means in the data recording device into which the IC card is manually insertable and removable therefrom.

3. An operation data recording system for an apparatus having an engine such as a vehicle and the like according to claim 2, in which means are provided for causing the sensors to sample corresponding conditions being detected in the order of one second intervals.

4. An operation data recording system for an apparatus having an engine such as a vehicle and the like according to claim 2, in which said plurality of sensors comprise a vehicle speed sensor and an engine r.p.m. sensor, and in which said arithmetic processing means comprises statistic processing means for statistically processing on the basis of numerical value data from said vehicle speed sensor and said engine r.p.m. sensor.

5. An operation data recording system for an apparatus having an engine such as a vehicle and the like according to claim 2, including in said operation data recording device manual inputting means comprising, a classification setting switch for choosing classification of manually input data, a value setting switch for setting the value thereof, a writing switch for writing data which is preset classification and value into the external memory unit or internal memory, a cancelling switch for cancelling written data, and a finish switch turned ON when operation data writing into the internal memory and to the external memory unit is finished.

6. An operation data recording system for an apparatus having an engine such as a vehicle and the like according to claim 2, in which said second sensor comprises a speed sensor which outputs a signal of vehicle non-operation when vehicle speed is zero and alternatively outputs a signal of vehicle operation when the speed has another value other than zero.

7. An operation data recording system for an apparatus having an engine such as a vehicle and the like according to claim 2, including means to increase detecting by said sensors of non-operation data for intervals of longer prescribed time than intervals of sampling of operation conditions.

8. An operation data recording system for an apparatus having an engine such as a vehicle and the like according to claim 7, in which said apparatus is a vehicle and in which vehicle operation data and non-actual work data are sampled by said detecting means at same sampling intervals, and including actual-work judging means for judging actual operation when actual work data are input on the basis of data obtained from said detecting means.

9. An operation data recording system for an apparatus having an engine such as a vehicle and the like according to claim 2, in which an external memory unit comprises a card memory.

10. An operation data recording system for an apparatus having an engine such as a vehicle and the like according to claim 9, in which said card memory comprises an IC card.

* * * * *